(12) United States Patent
Sumida et al.

(10) Patent No.: US 10,236,545 B2
(45) Date of Patent: Mar. 19, 2019

(54) ELECTRICITY STORAGE MODULE

(71) Applicants: AutoNetworks Technologies, Ltd., Yokkaichi, Mie (JP); Sumitomo Wiring Systems, Ltd., Yokkaichi, Mie (JP); Sumitomo Electric Industries, Ltd., Osaka-shi, Osaka (JP)

(72) Inventors: Tatsuya Sumida, Mie (JP); Kyohei Morita, Mie (JP)

(73) Assignees: AutoNetworks Technologies, Ltd., Yokkaichi, Mie (JP); Sumitomo Wiring Systems, Ltd., Yokkaichi, Mie (JP); Sumitomo Electric Industries, Ltd., Osaka (JP)

( * ) Notice: Subject to any disclaimer, the term of this patent is extended or adjusted under 35 U.S.C. 154(b) by 60 days.

(21) Appl. No.: 15/529,178

(22) PCT Filed: Nov. 25, 2015

(86) PCT No.: PCT/JP2015/082988
§ 371 (c)(1),
(2) Date: May 24, 2017

(87) PCT Pub. No.: WO2016/084821
PCT Pub. Date: Jun. 2, 2016

(65) Prior Publication Data
US 2017/0324131 A1    Nov. 9, 2017

(30) Foreign Application Priority Data

Nov. 26, 2014  (JP) .................................. 2014-238873

(51) Int. Cl.
*H01M 2/10* (2006.01)
*H01M 10/613* (2014.01)
(Continued)

(52) U.S. Cl.
CPC .......... *H01M 10/6556* (2015.04); *H01G 2/04* (2013.01); *H01G 2/08* (2013.01);
(Continued)

(58) Field of Classification Search
None
See application file for complete search history.

(56) References Cited

U.S. PATENT DOCUMENTS

2013/0078488 A1    3/2013 Nemoto et al.

FOREIGN PATENT DOCUMENTS

JP    2001-015090 A    1/2001
JP    2009-043462 A    2/2009
(Continued)

OTHER PUBLICATIONS

Search Report for International Application No. PCT/JP2015/082988, dated Jan. 26, 2016, 2 pp.

*Primary Examiner* — Maria Laios
(74) *Attorney, Agent, or Firm* — Honigman LLP

(57) ABSTRACT

An electricity storage module includes: multiple electricity storage elements; and a holding member formed by aligning multiple cavities in which the multiple electricity storage elements are stored, wherein an outer wall of the holding member has outer wall opening portions through which the multiple cavities communicate with the exterior, and outer surfaces of the multiple electricity storage elements stored in the multiple cavities are exposed to the exterior from the outer wall through the outer wall opening portions, and the holding member has a first cavity column in which cavities among the multiple cavities are aligned in two levels in an alignment direction, and a second cavity column in which cavities among the multiple cavities are aligned in two levels in the alignment direction at positions shifted in a direction intersecting with the alignment direction.

4 Claims, 16 Drawing Sheets

(51) Int. Cl.
   *H01M 10/625*    (2014.01)
   *H01M 10/6556*   (2014.01)
   *H01M 10/6562*   (2014.01)
   *H01G 2/04*      (2006.01)
   *H01G 2/08*      (2006.01)
   *H01G 11/10*     (2013.01)
   *H01G 11/18*     (2013.01)
   *H01G 11/76*     (2013.01)
   *H01G 11/82*     (2013.01)

(52) U.S. Cl.
   CPC ............. *H01G 11/10* (2013.01); *H01G 11/18* (2013.01); *H01G 11/76* (2013.01); *H01G 11/82* (2013.01); *H01M 2/10* (2013.01); *H01M 2/1077* (2013.01); *H01M 10/613* (2015.04); *H01M 10/625* (2015.04); *H01M 10/6562* (2015.04); *H01M 2220/20* (2013.01)

(56) References Cited

FOREIGN PATENT DOCUMENTS

| | | |
|---|---|---|
| JP | 2010-225449 A | 10/2010 |
| JP | 2013-084580 A | 5/2013 |

ELECTRICITY STORAGE MODULE

CROSS-REFERENCE TO RELATED APPLICATIONS

This application is the U.S. national stage of PCT/JP2015/082988 filed Nov. 25, 2015, which claims priority of Japanese Patent Application No. JP 2014-238873 filed Nov. 26, 2014.

TECHNICAL FIELD

The present invention relates to an electricity storage module.

BACKGROUND

Conventionally, an electricity storage module formed by aligning multiple electricity storage elements has been known as a power source for an electric automobile, a hybrid car, or the like (see JP 2010-225449M. In this electricity storage module, electrodes of electricity storage elements are connected to each other in a state in which the multiple electricity storage elements are arranged aligned in a column.

Electricity storage elements generate heat during charging and discharging. For this reason, in a configuration in which multiple electricity storage elements are aligned in a column as in the electricity storage module disclosed in the conventional technique, heat generated by the multiple electricity storage elements is trapped near the electricity storage elements arranged near the center of the column, and thus there is concern that a high temperature will be reached locally. Thus, there is concern that the deterioration of the charging and discharging performance will progress more quickly than that of the other electricity storage elements. Furthermore, it is even more problematic in the case where multiple electricity storage elements are held in a case in a state of being in alignment.

The present invention has been completed based on the above-described circumstances, and aims to provide an electricity storage module with an excellent heat dissipating property.

SUMMARY OF INVENTION

An electricity storage module according to the present invention includes: a plurality of electricity storage elements; and a holding member formed by aligning a plurality of cavities in which the plurality of electricity storage elements are stored, wherein an outer wall of the holding member has outer wall opening portions through which the plurality of cavities communicate with the exterior, and outer surfaces of the plurality of electricity storage elements stored in the plurality of cavities are exposed from the outer wall through the outer wall opening portions, and the holding member has a first cavity column in which cavities among the plurality of cavities are aligned in two levels in an alignment direction, and a second cavity column in which cavities among the plurality of cavities are aligned in two levels in the alignment direction at positions shifted in a direction intersecting with the alignment direction.

According to the present invention, external air flows into the interior of the holding member through the outer wall opening portions formed in the outer wall of the holding member. Since the outer surfaces of the electricity storage elements are exposed at the outer wall opening portions, the outer surfaces of the electricity storage elements are reliably cooled by air that has flowed in through the outer wall opening portions. This makes it possible to suppress a case in which the electricity storage elements reach a high temperature. Thus, according to the present embodiment, it is possible to improve the heat dissipating property of the electricity storage module.

On the other hand, in the interior of the holding member, air warmed by the heat generation of the electricity storage elements can flow out to the exterior of the holding member through the outer wall opening portions. This makes it possible to suppress a case in which the interior of the holding member locally reaches a high temperature.

Also, the cavities are aligned in two levels in the first cavity column and the second cavity column. Accordingly, an arrangement is achieved in which two electricity storage elements are aligned in the vertical direction. Also, the outer surfaces of the electricity storage elements face the exterior of the holding member through the outer wall opening portions, and therefore there is no electricity storage element that is arranged such that heat is trapped between multiple electricity storage elements. As a result, it is possible to suppress a case in which the electricity storage elements reach a high temperature.

Also, the multiple electricity storage elements are stored in the interiors of the cavities in the first cavity column and the cavities in the second cavity column. Accordingly, four electricity storage elements are stored in the holding member with an improved heat dissipating property. For this reason, if a relatively high voltage is required, the electricity storage elements need only be connected in series, if a relatively longer lifespan is required, the electricity storage elements need only be connected in parallel, and depending on the required conditions, it is possible to use a configuration in which both a series connection and a parallel connection are present.

Also, the electricity storage module according to the present invention includes: a plurality of electricity storage elements; and a holding member formed by aligning a plurality of cavities in which the plurality of electricity storage elements are stored, wherein an outer wall of the holding member has outer wall opening portions that communicate with the plurality of cavities, and outer surfaces of the plurality of electricity storage elements stored in the plurality of cavities are exposed to the exterior of the holding member through the outer wall opening portions, and the holding member has a cavity column in which the plurality of cavities are aligned in two levels or three levels in an alignment direction.

According to the present invention, in one cavity column, two or three cavities are aligned in the vertical direction. For this reason, it is relatively easier for heat to be trapped near the center in the vertical direction of the cavity column.

In view of this, in the present invention, the outer surfaces of the electric storage elements are exposed through the outer wall opening portions. Accordingly, the electricity storage elements arranged on the upper side and the lower side are cooled by air that flows into the interior of the holding member through the outer wall opening portions. For this reason, the heat generated by the electric storage element arranged near the center in the vertical direction is dispersed to the exterior of the holding member via the electricity storage element arranged on the upper side and the electricity storage element arranged on the lower side. As a result, it is possible to suppress a case in which the vicinity of the center in the vertical direction of the cavity column locally reaches a high temperature.

The following aspects are preferable as embodiments of the present invention.

It is preferable that the plurality of electricity storage elements each have an electrode surface on which a pair of electrode terminals are formed, and the plurality of electricity storage elements are arranged in the holding member in a state in which the electrode surfaces of the plurality of electrode storage elements stored in the first cavity column and the electrode surfaces of the plurality of electrode storage elements stored in the second cavity column face mutually opposite directions.

According to the above-described aspect, it is possible to compactly store the multiple electricity storage elements in the holding member. If the electricity storage elements are stored compactly, heat tends to be trapped inside of the holding member, and therefore the present aspect is particularly effective in such a configuration.

The holding member includes an inter-column partitioning wall that partitions the first cavity column and the second cavity column, and the inter-column partitioning wall includes an inter-column opening portion through which the first cavity column communicates with the second cavity column.

According to the above-described aspect, air can flow between the cavities constituting the first cavity column and the cavities constituting the second cavity column, and therefore it is possible to further suppress a case in which the interior of the holding member locally reaches a high temperature.

The holding member has an inter-layer partitioning wall that partitions the plurality of cavities aligned in the alignment direction, and the inter-layer partitioning wall has an inter-layer opening portion that penetrates through the inter-layer partitioning wall.

According to the above-described aspect, air can flow between the multiple cavities aligned in the alignment direction, and therefore it is possible to further suppress a case in which the interior of the holding member locally reaches a high temperature.

Ribs that protrude inward are formed on inner walls of the plurality of cavities, and the plurality of electricity storage elements are stored in the interiors of the plurality of cavities in a state in which gaps are present between the plurality of electricity storage elements and the inner walls of the plurality of cavities due to the electricity storage elements coming into contact with the ribs.

According to the above-described aspect, air can flow through the gaps formed between the outer surfaces of the electricity storage elements and the inner walls of the cavities. As a result, air that has flowed into the holding member through the outer wall opening portions comes into contact with a large portion of the outer surfaces of the electricity storage elements, whereby it is possible to reliably cool the electricity storage elements.

According to the present invention, it is possible to improve the heat dissipating property of the electricity storage module.

DETAILED DESCRIPTION OF THE PREFERRED EMBODIMENTS

Embodiment 1 of the present invention will be described with reference to FIGS. 1 to 15. The present embodiment is an electricity storage module 11 having multiple electricity storage elements 10. The electricity storage module 11 according to the present embodiment can be used as a power source or an auxiliary power source for a vehicle (not shown) such as an automobile, an electric automobile, or a hybrid car. In the following description, the X direction is rightward, the Y direction is forward, and the Z direction is upward.

Note that the above-described directions are used for convenience in the description of the embodiment, and the electricity storage module 11 according to the present embodiment can be attached in any orientation to a vehicle, according to need.

Holding Member 12

Figure 1:
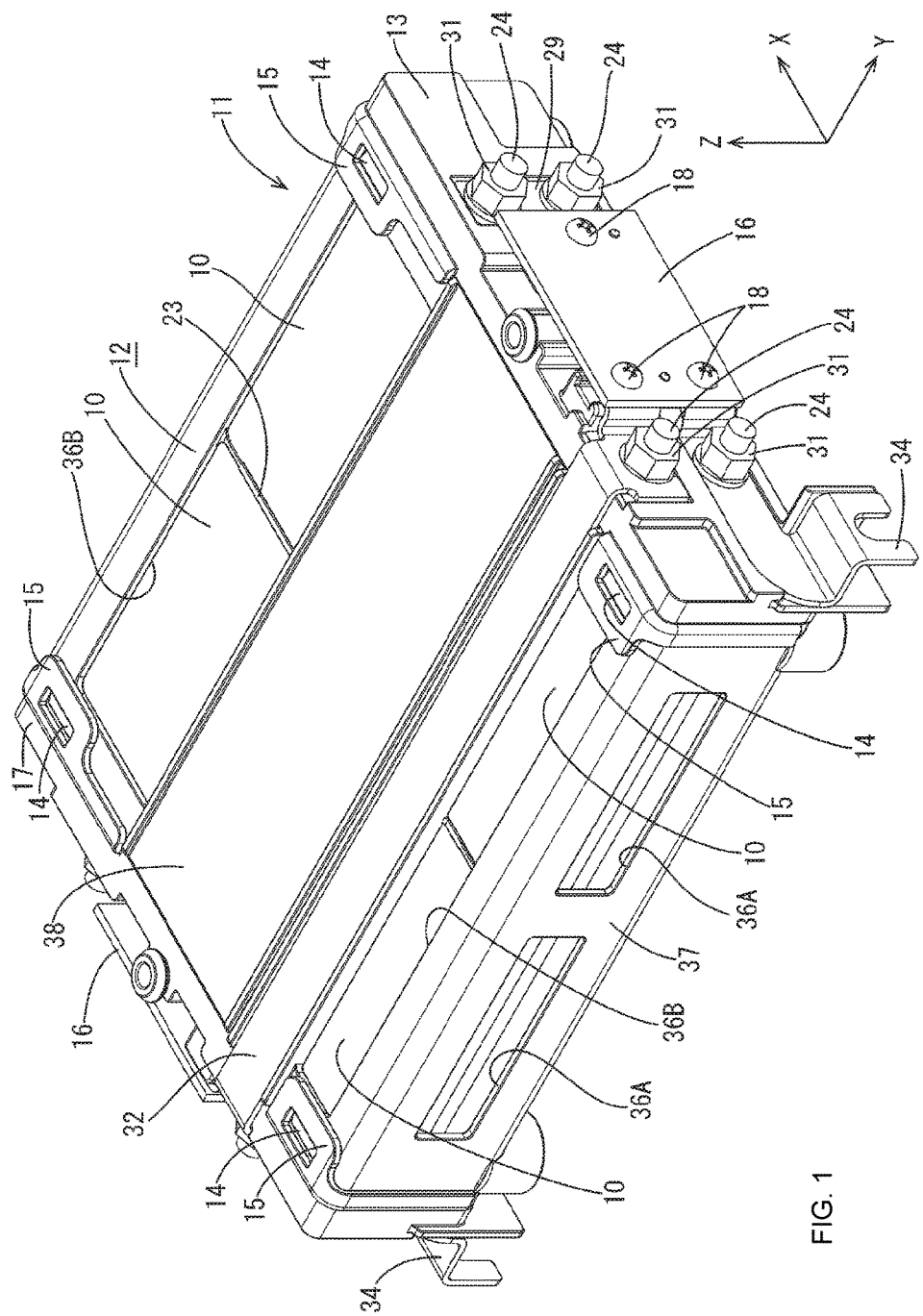
FIG. 1 is a perspective view showing an electricity storage module according to Embodiment 1.
Figure 2:
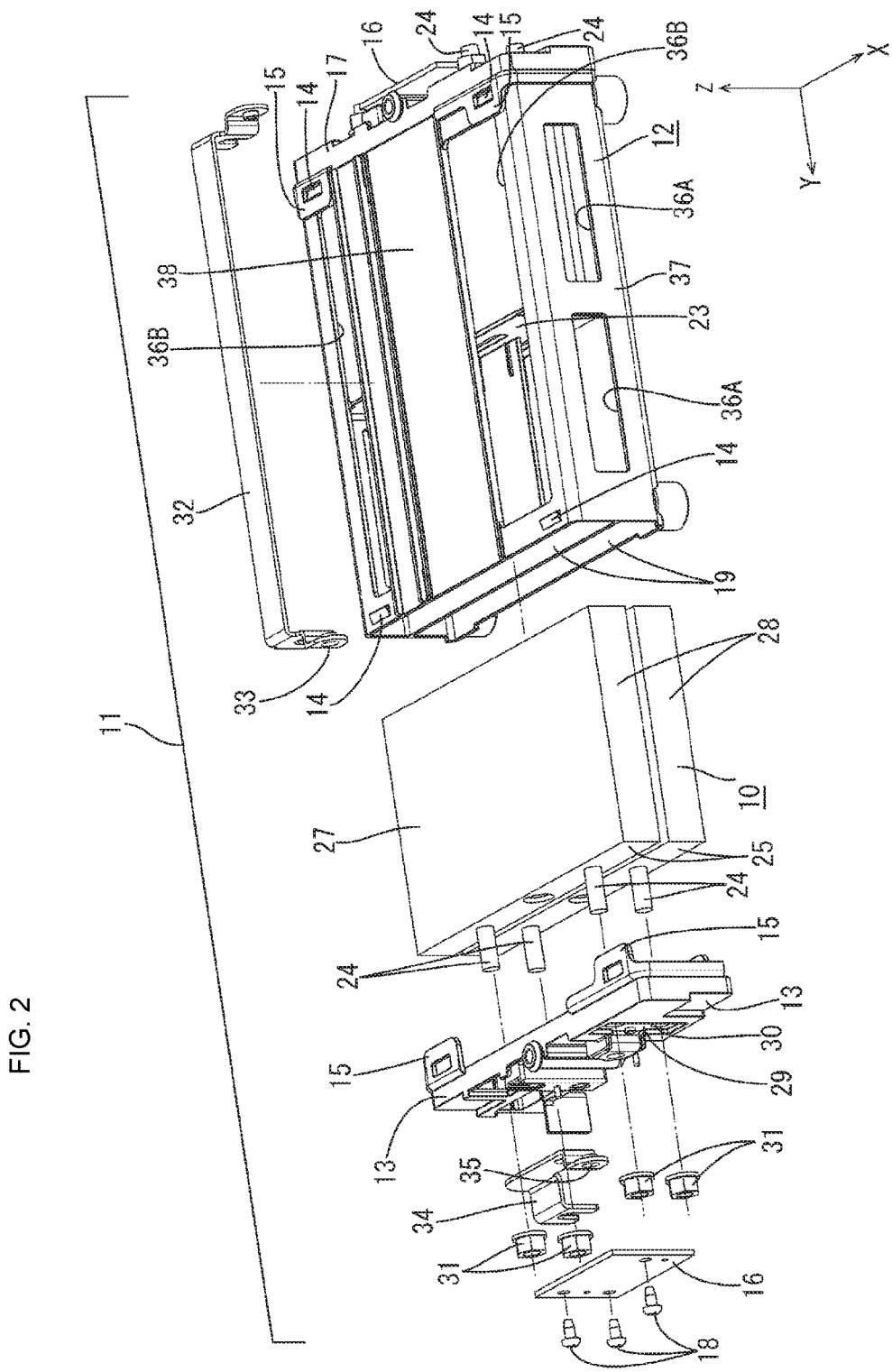
FIG. 2 is an exploded perspective view showing an electricity storage module.

As shown in FIGS. 1 and 2, the electricity storage module 11 has a flat cuboid shape that is relatively thin in the vertical direction compared to the front-rear direction and the left-right direction. The electronic storage module 11 has a holding member 12 made of synthetic resin that is open in the front-rear direction. The opening on the front side of the holding member 12 is covered due to a first cover 13 made of synthetic resin being attached thereto. The first cover 13 and the holding member 12 are assembled due to a lock portion 14 formed on the opening end portion on the front side of the holding member 12 and a lock receiving portion 15 formed on the first cover 13 being elastically engaged. A circuit board 16 is fixed by bolts 18 on the front surface of the first cover 13.

Also, an opening on the rear side of the holding member 12 is covered due to a second cover 17 made of synthetic resin being attached thereto. The second cover 17 and the holding member 12 are assembled due to a lock portion 14 formed on the opening end portion on the rear side of the holding member 12 and a lock receiving portion 15 formed on the second cover 17 being elastically engaged. A circuit board 16 is fixed by bolts 18 on the rear surface of the second cover 17.

Circuits for determining the states (e.g., voltages, currents, temperatures, etc.) of the multiple electricity storage elements 10 are formed on the circuit board 16 attached to the first cover 13 and the circuit board 16 attached to the second cover 17.

Figure 4:
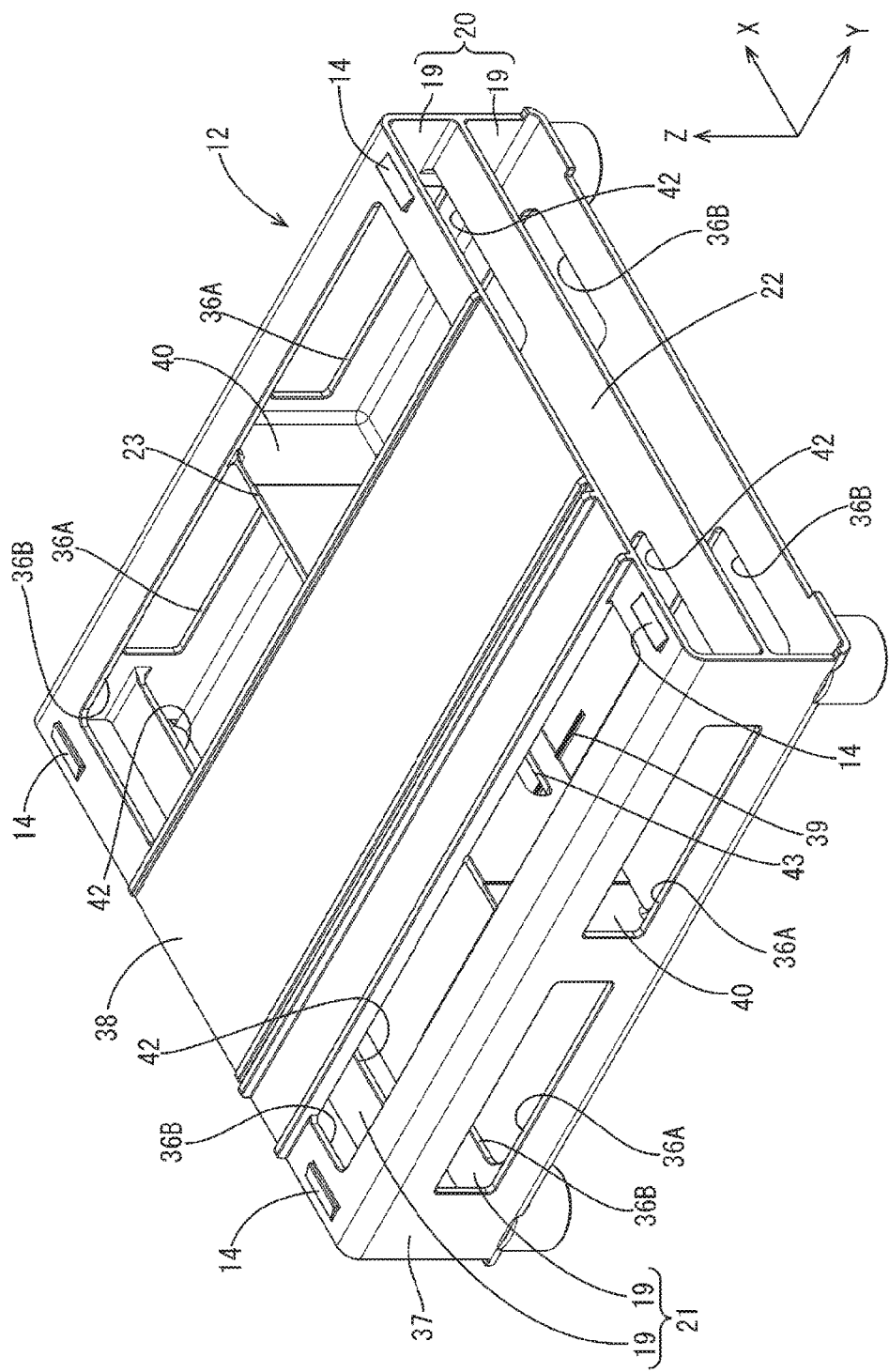
FIG. 4 is a perspective view showing a holding member.

As shown in FIG. 4, multiple cavities 19 for storing the multiple electricity storage elements 10 are formed in the holding member 12. A first cavity column 20 that is open to the front and in which cavities 19 are aligned in two levels in the vertical direction (corresponds to the alignment direction) is formed on the front side of the holding member 12. The cavities 19 of the first cavity column 20 are open to the front.

A second cavity column 21 that is open to the rear and in which cavities 19 are aligned in two levels in the vertical direction (corresponds to the alignment direction) is formed on the rear side of the holding member 12. The cavities 19 of the second cavity column 21 are open to the rear.

The first cavity column 20 and the second cavity column 21 are formed at positions that are shifted in a direction that intersects the vertical direction. In the present embodiment, the first cavity column 20 and the second cavity column 21 are formed shifted in the front-rear direction.

In the holding member 12, an inter-layer partitioning wall 22 that partitions the two cavities 19 aligned in the vertical direction is formed in the first cavity column 20. Also, in the holding member 12, an inter-layer partitioning wall 22 that partitions the two cavities 19 aligned in the vertical direction is formed in the second cavity column 21 as well.

Also, in the holding member 12, an inter-column partitioning wall 23 that partitions the cavities 19 constituting the first cavity column 20 and the cavities 19 constituting the second cavity column 21 is formed in the storage member 12.

Electricity Storage Element 10

As shown in FIG. 2, the electricity storage elements 10 are stored in the cavities 19. The electricity storage elements 10 have a flat cuboid shape that is relatively thin in the vertical direction compared to the front-rear direction and the left-right direction. The electricity storage elements 10 each have an electrode surface 25 on which a protruding pair of electrode terminals 24 composed of a positive electrode terminal and a negative electrode terminal are formed, a bottom surface 26 located on a side opposite to the electrode surface 25, a pair of long side surfaces 27 that face the vertical direction, and a pair of short side surfaces 28 that face the left-right direction.

The electricity storage elements 10 arranged in the cavities 19 constituting the first cavity column 20 are arranged in an orientation in which the electrode surfaces 25 face forward. Also, the electricity storage elements 10 arranged in the cavities 19 constituting the second cavity column 21 are arranged in an orientation in which the electrode surfaces 25 face rearward. Thus, the electrode surfaces 25 of the electricity storage elements 10 arranged in the cavities 19 of the first cavity column 20 and the electrode surfaces 25 of the electricity storage elements 10 arranged in the cavities 19 of the second cavity column 21 face opposite directions. Also, the bottom surfaces 26 of the electricity storage elements 10 arranged in the cavities 19 of the first cavity column 20 and the bottom surfaces 26 of the electricity storage elements 10 arranged in the cavities 19 of the second cavity column 21 oppose each other.

For example, lithium ion capacitors can be used as the electricity storage elements 10 according to the present embodiment. Also, lithium ion secondary batteries can be used as the electricity storage elements 10. Also, in addition to the above description, any electricity storage elements, such as electrical double-layer capacitors or nickel-hydrogen secondary batteries, can be used as the electricity storage elements 10 according to need.

The electrode terminals 24 are formed so as to protrude from the electrode surface 25. The electrode terminals 24 are made of metal and have screw threads formed on their surfaces. The electrode terminals 24 of electricity storage elements 10 that are vertically adjacent are electrically connected by having nuts 31 screwed thereon while inserted into through holes 30 formed in a first bus bar 29.

Figure 5:
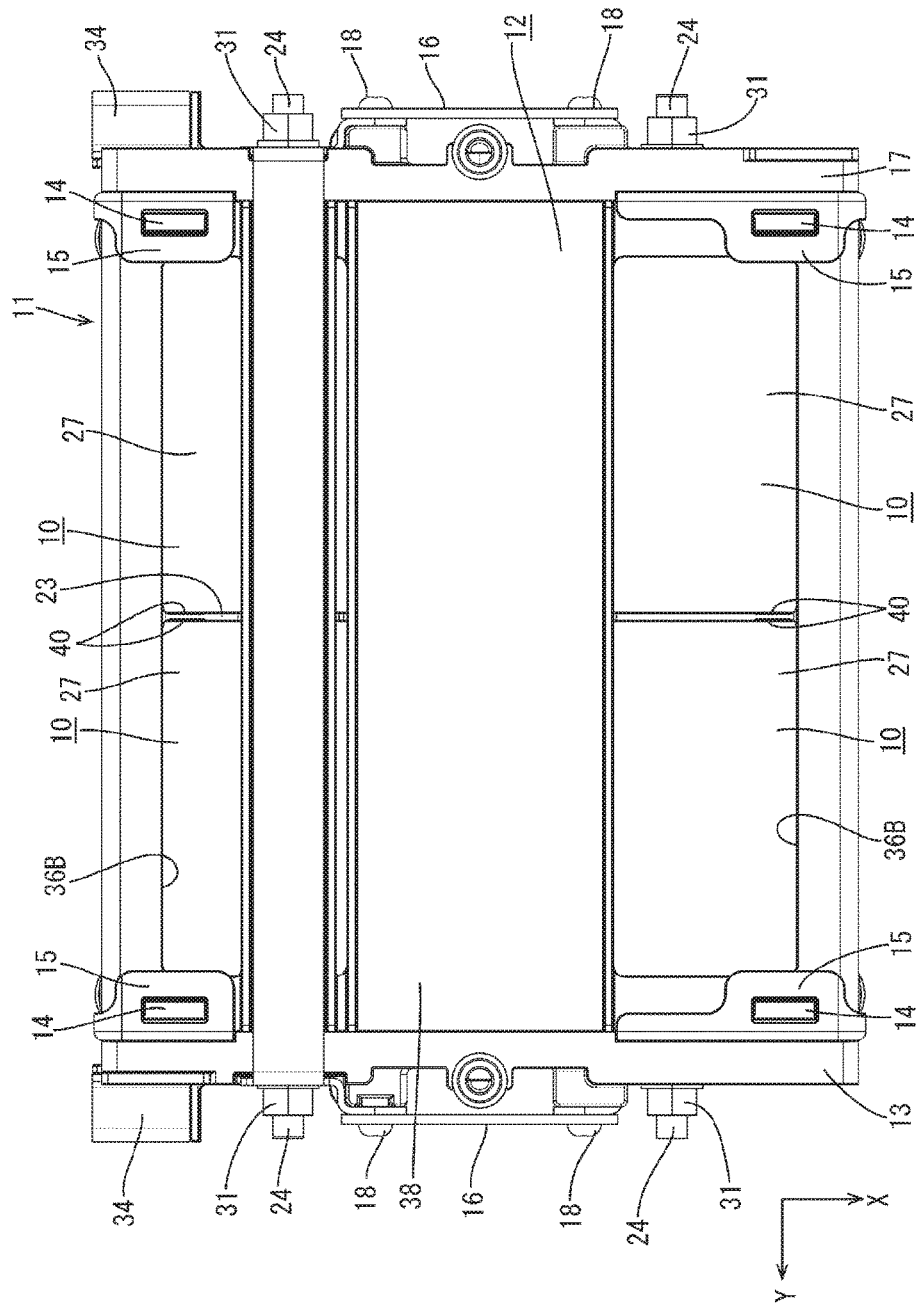
FIG. 5 is a plan view showing an electricity storage module.

Also, as shown in FIG. 5, the electrode terminals 24 of the electricity storage elements 10 arranged in the cavities 19 of the first cavity column 20 and the electrode terminals 24 of the electricity storage element 10 arranged in the cavities 19 of the second cavity column 21 are electrically connected by a second bus bar 32. The second bus bar 32 is arranged so as to conform to the upper surface of the holding member 12, and connects the electrode terminal 24 on the front surface side of the holding member 12 and the electrode terminal 24 on the rear surface side of the holding member 12. The electrode terminals 24 and the second bus bar 32 are electrically connected due to the electrode terminals 24 being inserted into through holes 33 formed in the second bus bar 32 and having nuts 31 screwed thereon.

Figure 8:
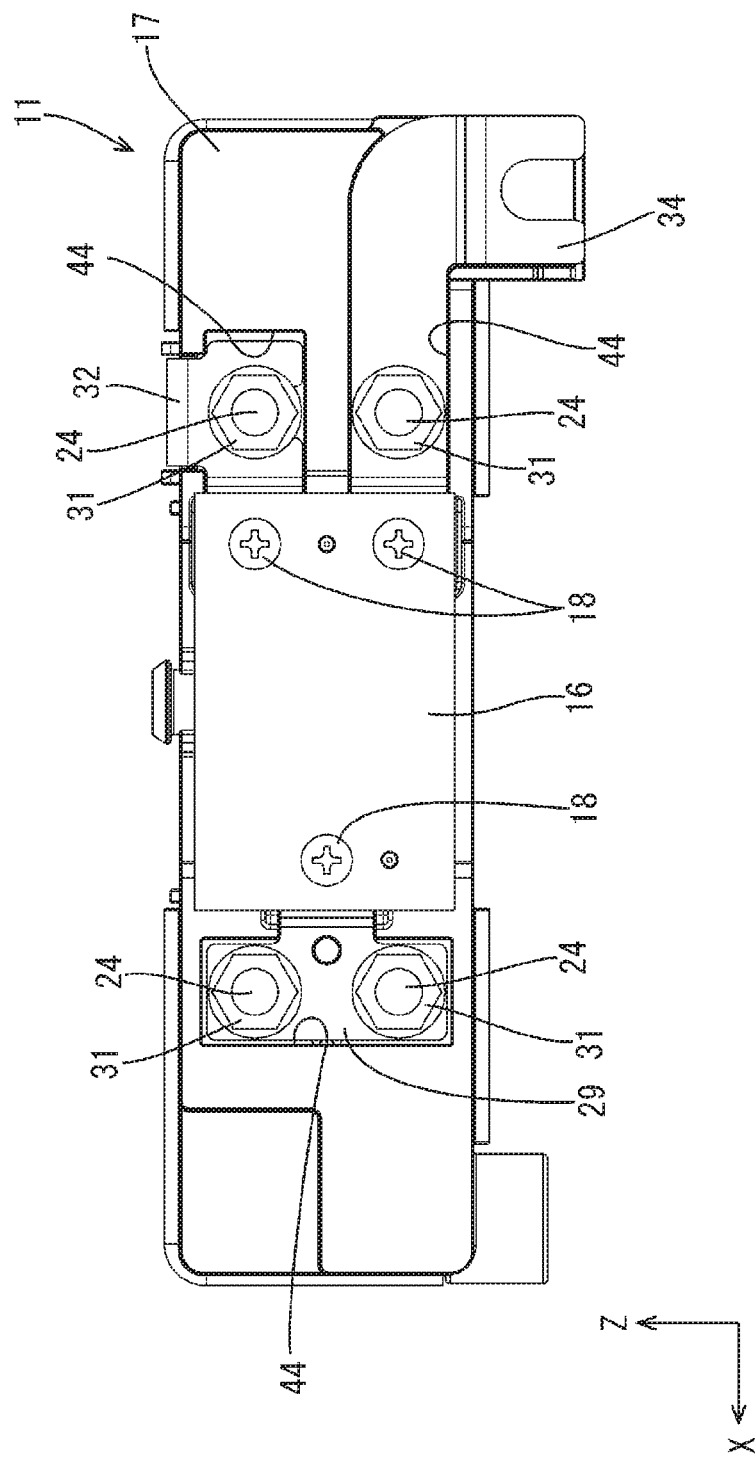
FIG. 8 is a rear side view showing an electricity storage module.
Figure 9:
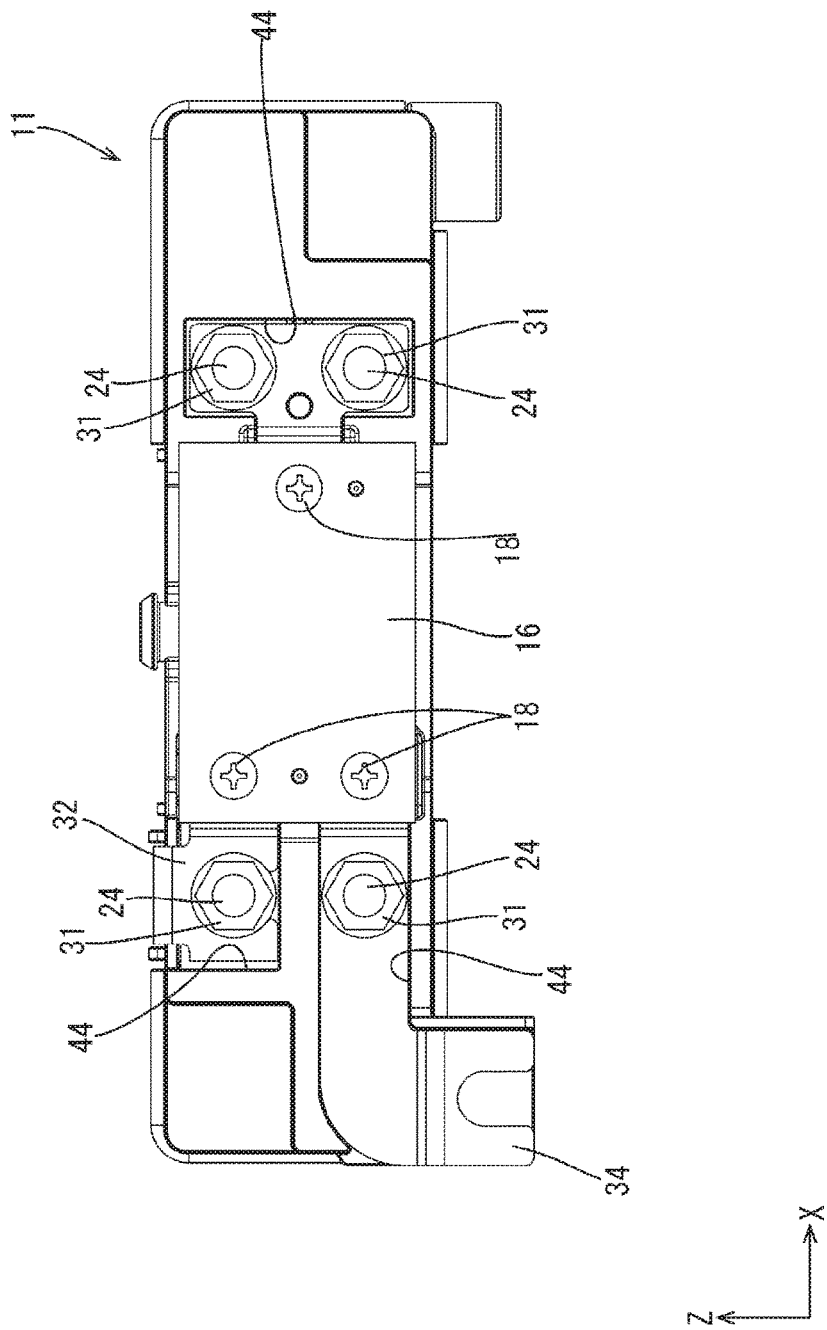
FIG. 9 is a front side view showing an electricity storage module.

As shown in FIGS. 8 and 9, output bus bars 34 for electrically connecting to an external device (not shown) are attached to the electrode terminals 24 of the electricity storage elements 10 on the first cavity column 20 side, and to the electrode terminals 24 of the electricity storage elements 10 on the second cavity column 21 side. The electrode terminals 24 and the output bus bars 34 are electrically connected due to the electrode terminals 24 being inserted into the through holes 35 formed in the output bus bars 34 and having the nuts 31 screwed thereon.

Figure 3:
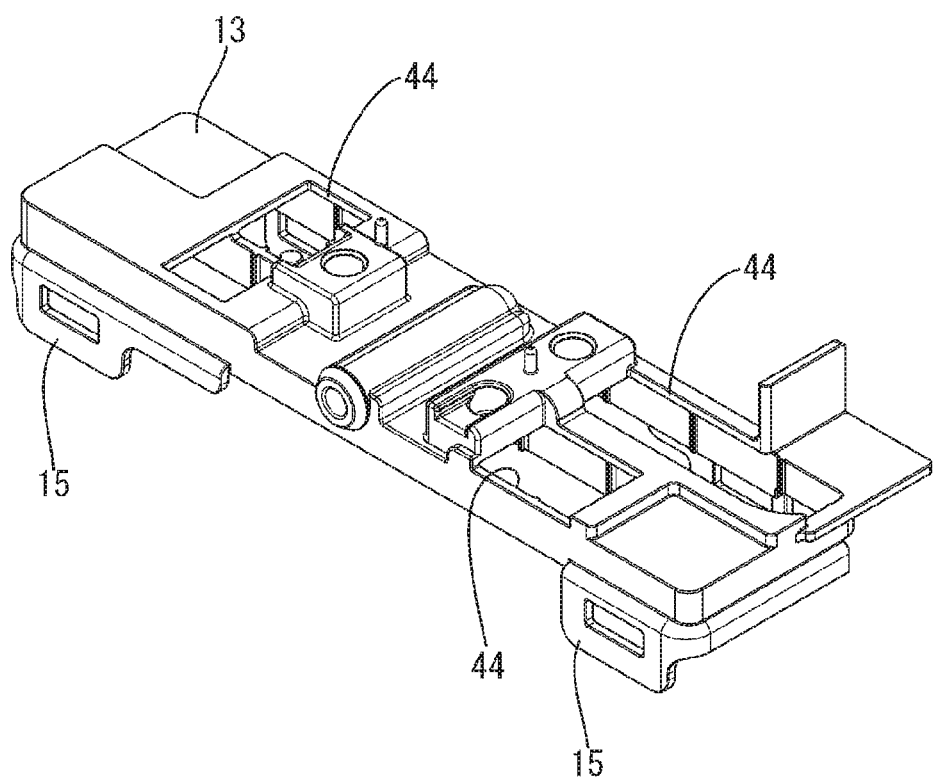
FIG. 3 is a perspective view showing a first cover.

As shown in FIG. 3, three window portions 44 that penetrate through the first cover 13 in the front-rear direction are formed in the first cover 13. Portions of the first bus bar 29 and the second bus bar 32 that are connected to the electrode terminals 24 and a portion of the output bus bar 34 that is connected to the electrode terminals 24 are stored in the window portions 44. Also, window portions 44 are similarly formed in the second cover 17 as well.

Heat Dissipation Structure

Figure 6:
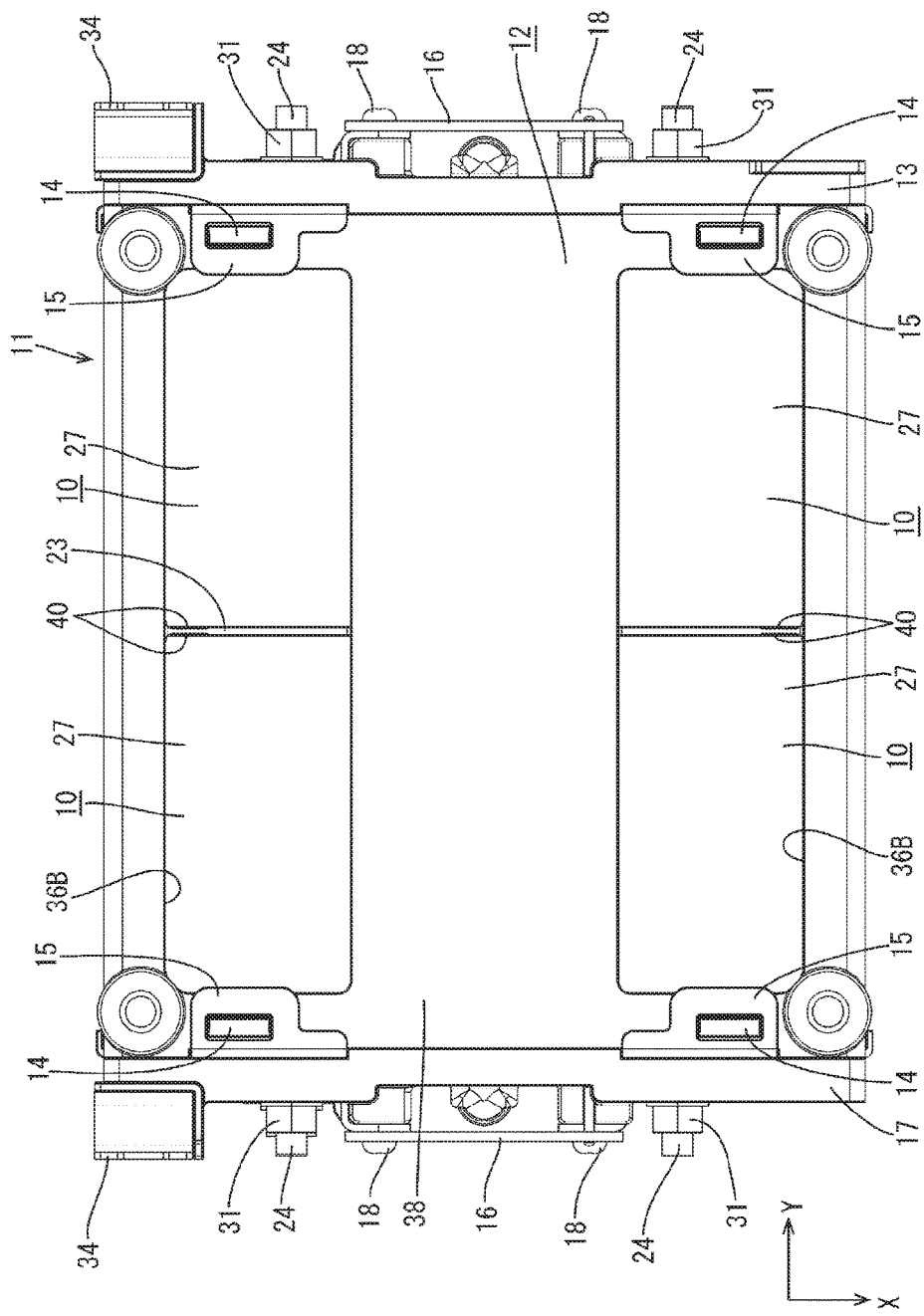
FIG. 6 is a bottom surface view showing an electricity storage module.
Figure 7:
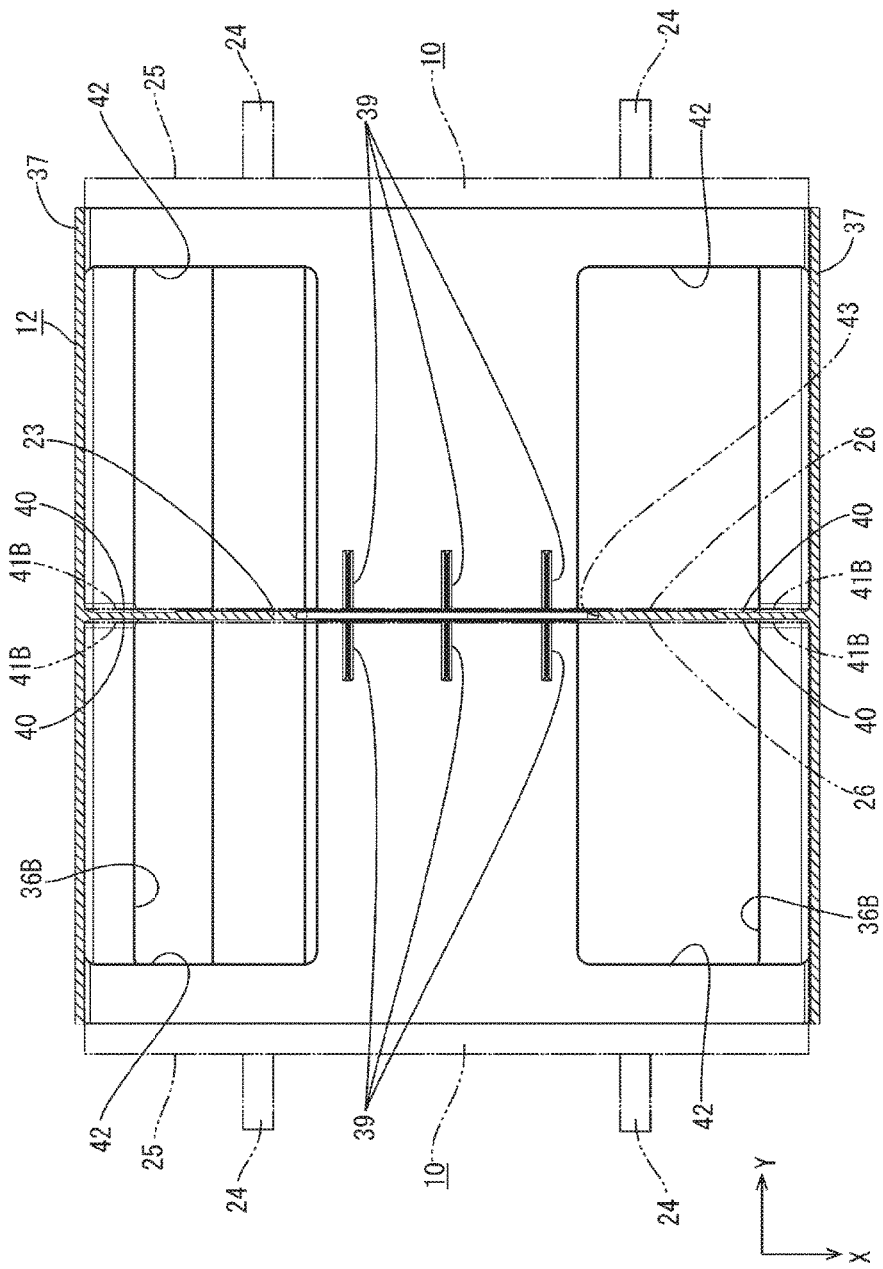
FIG. 7 is a cross-sectional view taken along line VII-VII in FIG. 14.

As shown in FIG. 4, on the outer walls of the holding member 12, outer wall opening portions 36 through which the cavities 19 communicate with the exterior are formed on the upper surface (long side surface 38), the lower surface (long side surface 38), the right side surface (short side surface 37), and the left side surface (short side surface 37) of the holding member 12. In other words, the outer wall opening portions 36 are formed so as to penetrate through the outer walls of the holding member 12. As shown in FIGS. 5 and 6, when the electricity storage elements 10 are stored in the cavities 19, the outer surfaces of the electricity storage elements 10 are exposed to the exterior of the holding member 12 through the outer wall opening portions 36. Air can flow into the cavities 19 through the outer wall opening portions 36. Also, air can flow out from the cavities 19 through the outer wall opening portions 36.

Two outer wall opening portions 36A that are aligned in the front-rear direction and have rectangular shapes are formed on each of the short side surfaces 37 that face the left-right direction of the outer walls of the holding member 12. The outer wall opening portions 36A are formed at positions corresponding to the first cavity column 20 and the second cavity column 21.

Two outer wall opening portions 36B that are aligned in the left-right direction and have rectangular shapes are formed on the long side surfaces 38 of the outer wall of the holding member 12. The outer wall opening portions 36B are formed so as to span across the first cavity column 20 and the second cavity column 21 on the long side surfaces 38 of the holding member 12.

As shown in FIGS. 7, 11, 14, and 15, multiple ribs 39 are formed so as to protrude inward on the inner walls of the cavities 19. The ribs 39 are formed extending in the front-rear direction. Accordingly, it is possible to reduce the force that is needed when storing the electricity storage elements 10 in the cavities 19. The ribs 39 are formed on the wall surfaces on the inner sides of the long side surfaces 38 of the holding members 12 and on the wall surfaces of the inter-layer partitioning wall 22. On each wall surface, three ribs 39 are formed in alignment at an interval in the left-right direction at positions near the inter-column partitioning wall 23.

Figure 12:
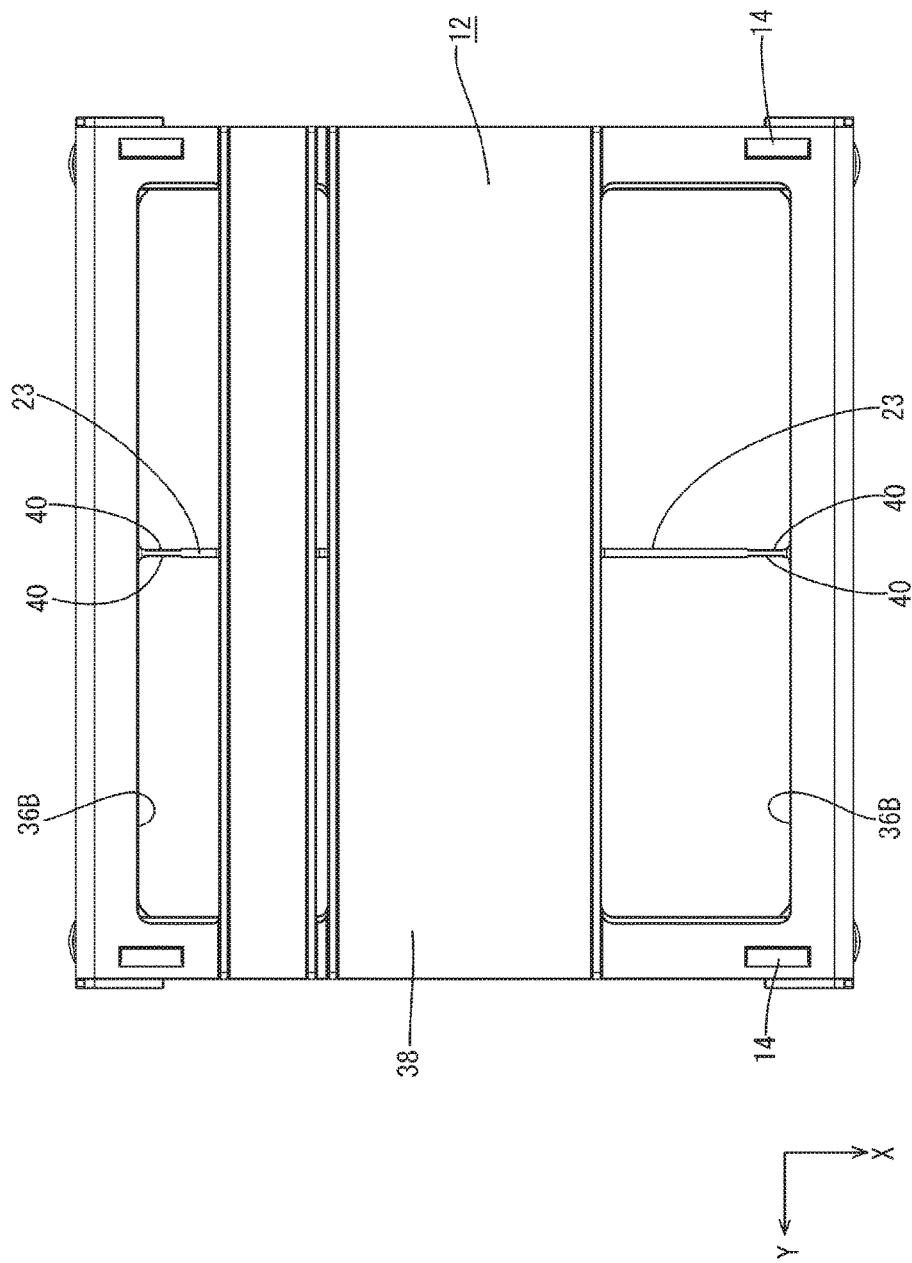
FIG. 12 is a plan view showing a holding member.
Figure 13:
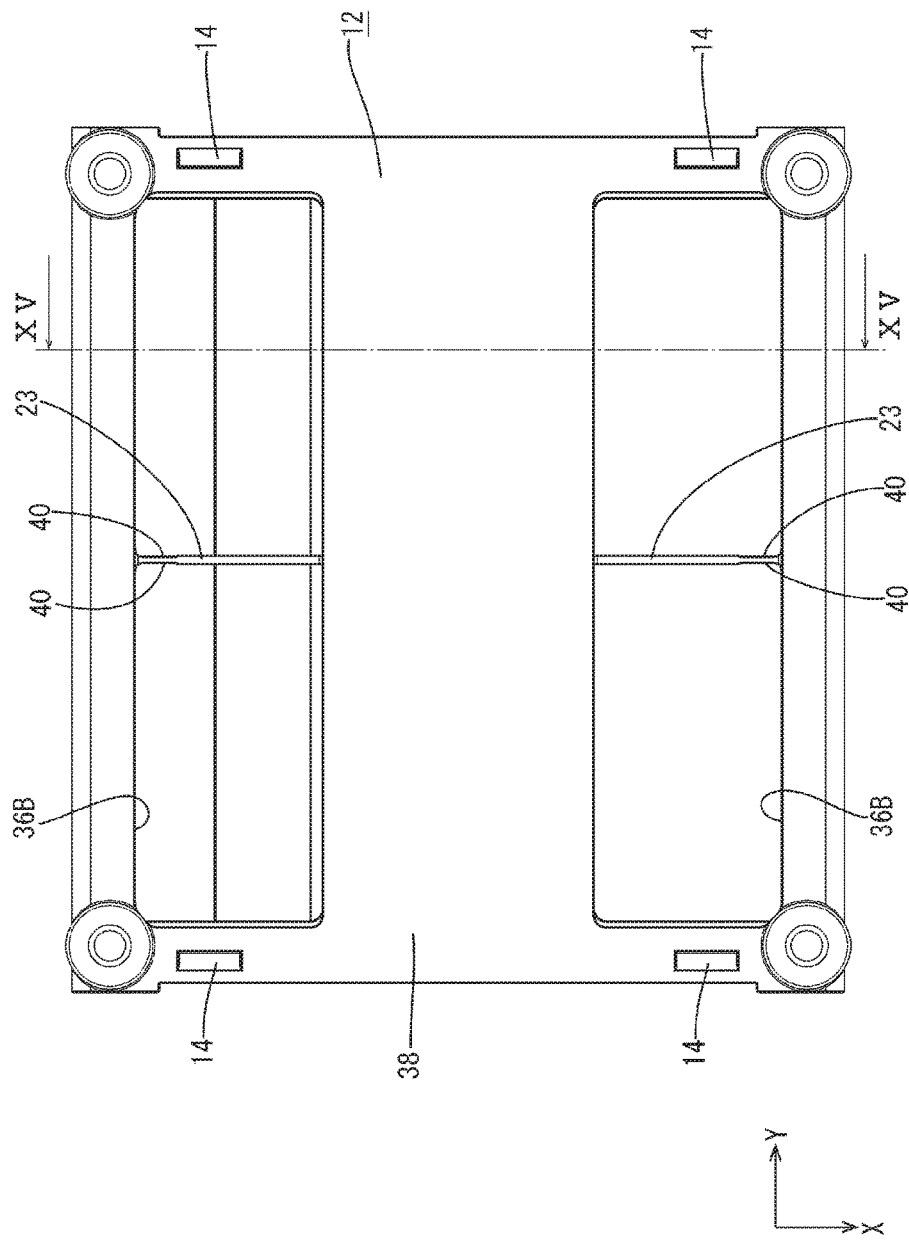
FIG. 13 is a bottom surface view showing a holding member.
Figure 14:
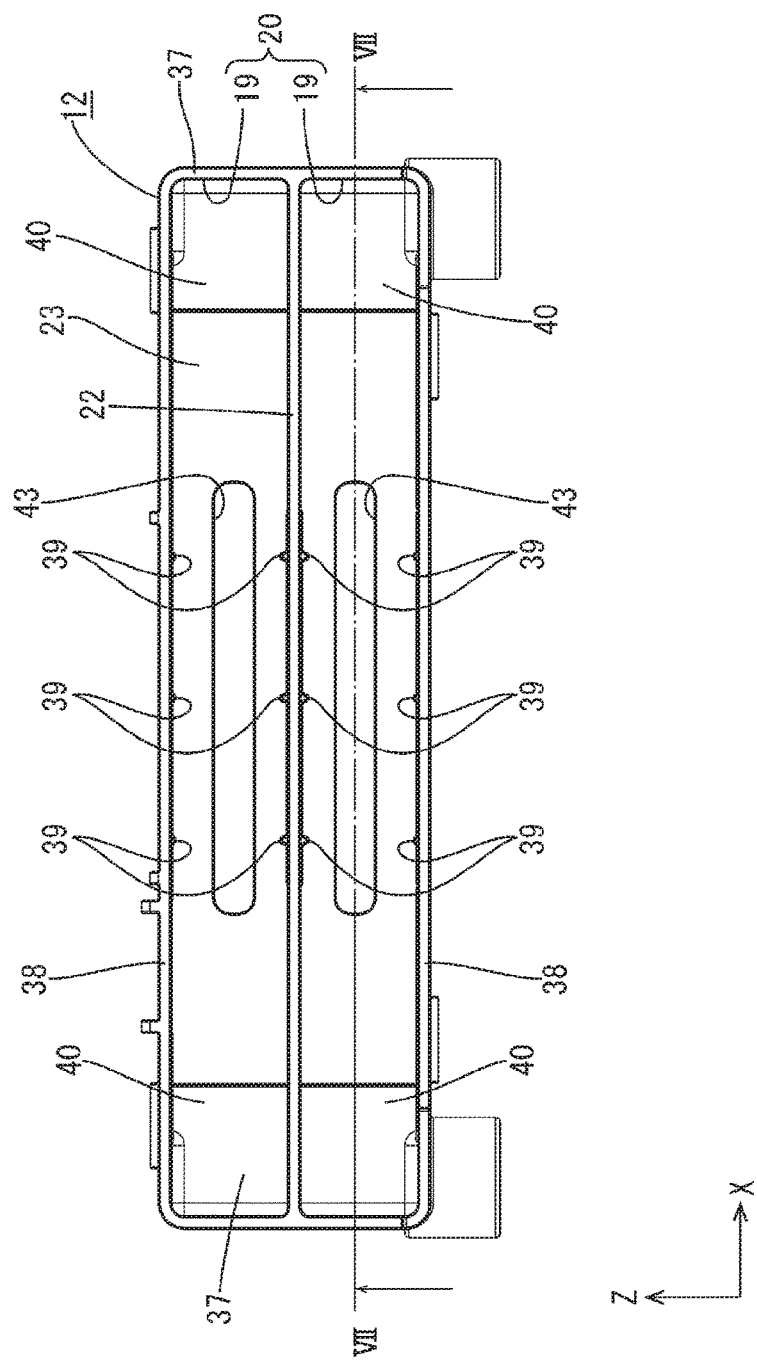
FIG. 14 is a front side view showing a holding member.
Figure 15:
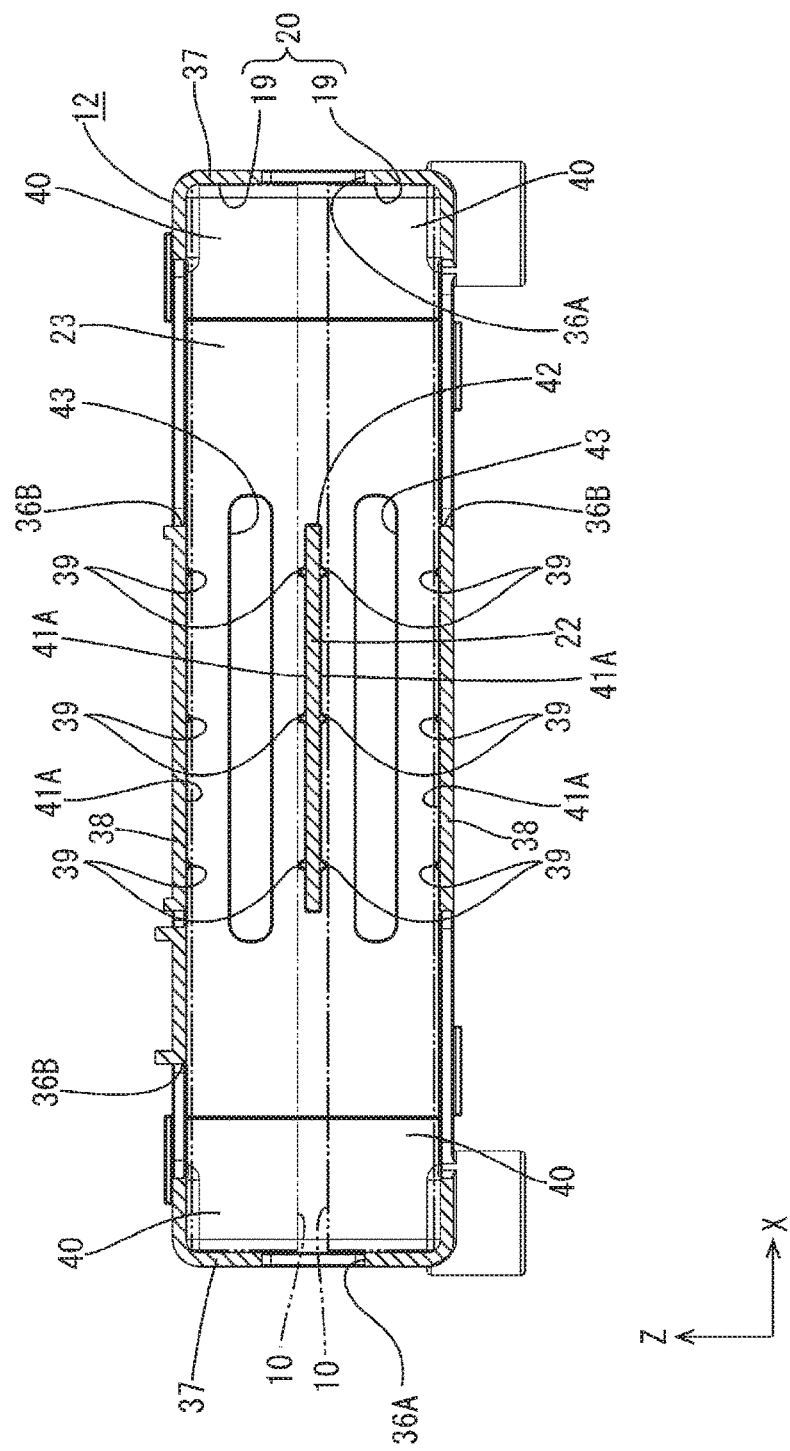
FIG. 15 is a cross-sectional view taken along line XV-XV in FIG. 13.

Furthermore, as shown in FIGS. 12 and 13, recessed portions 40 are formed at positions near both end portions in the left-right direction of the inter-column partitioning wall 23. At the portions where the recessed portions 40 are formed, gaps 41B are formed between the inter-column partitioning wall 23 and the bottom surfaces 26 of the electricity storage elements 10.

Figure 10:
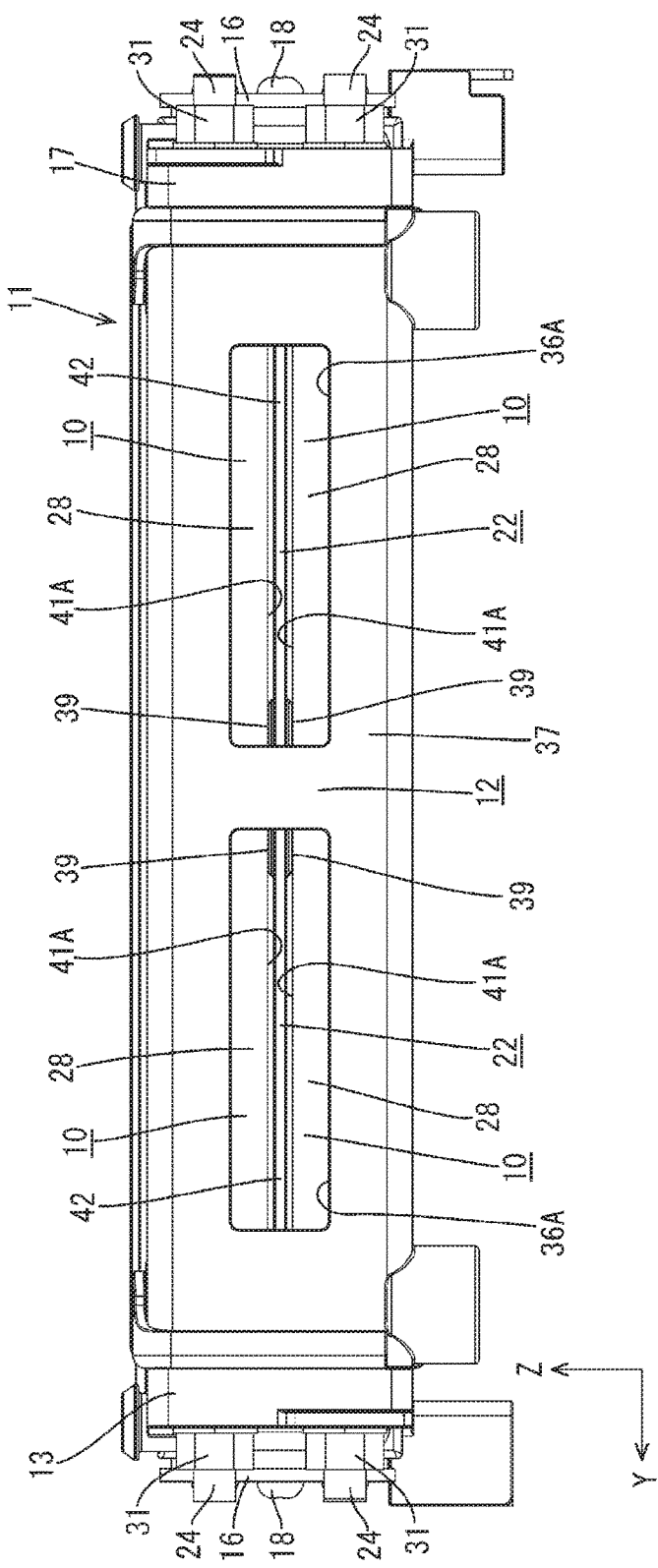
FIG. 10 is a right side view showing an electricity storage module.
Figure 11:
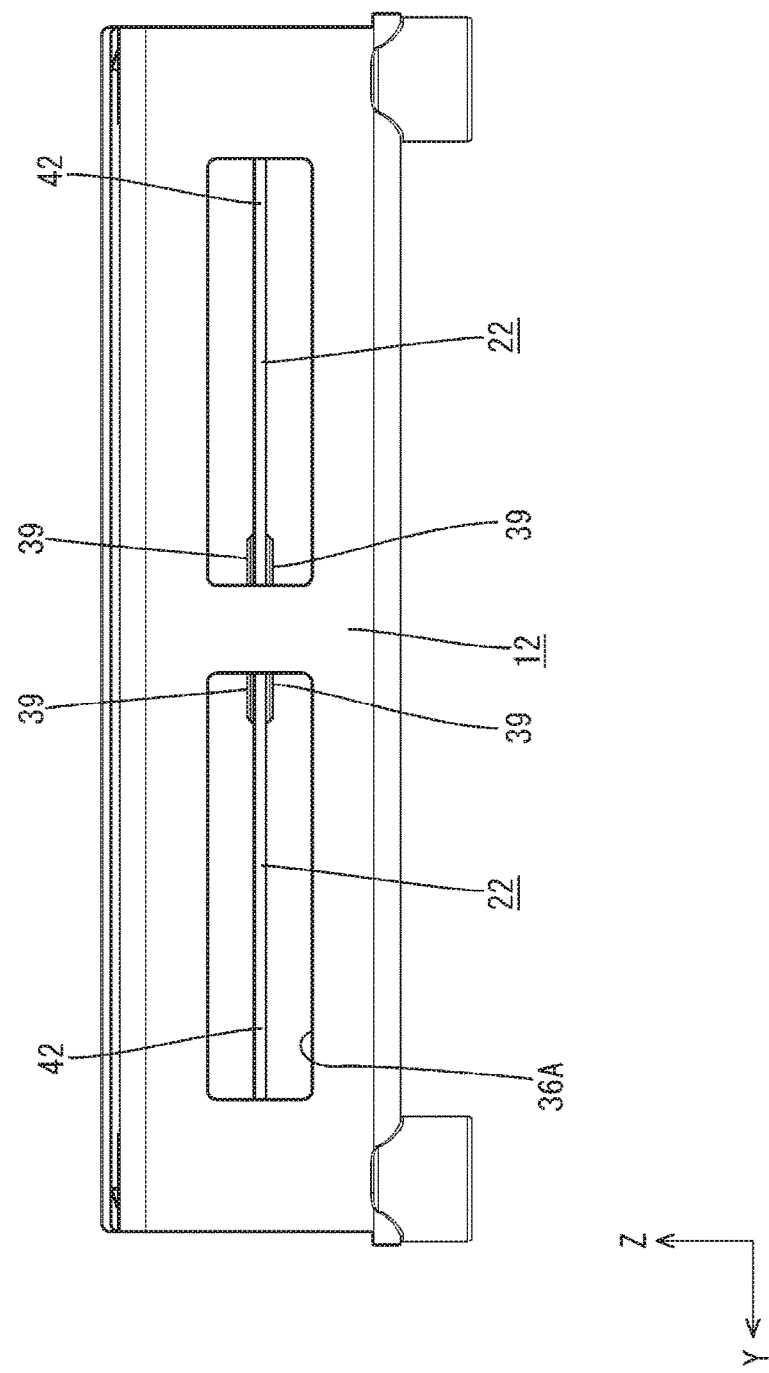
FIG. 11 is a right side view showing a holding member.

As shown in FIG. 10, when the electricity storage elements 10 are stored in the interiors of the cavities 19, the outer surfaces of the electricity storage elements 10 and the ribs 39 come into contact with each other, whereby the gaps 41A are formed between the outer surfaces of the electricity storage elements 10 and the inner walls of the cavities 19. Air that flows in through the outer wall opening portions 36 and air that attempts to flow out through the outer wall opening portions 36 can flow in these gaps 41A. Accordingly, the outer surface of the electricity storage element 10 is cooled by air that flows through.

In the inter-layer partitioning wall 22, inter-layer opening portions 42 through which the cavities 19 aligned in the vertical direction communicate with each other are formed so as to penetrate through the inter-layer partitioning wall 22. Accordingly, air can flow between the cavities 19 aligned in the vertical direction. Each inter-layer partitioning wall 22 has two inter-layer opening portions 42 that are aligned in the left-right direction.

The rims of the inter-layer opening portions 42 are opposite to the outer wall opening portions 36A that are formed on the short side surfaces 37 (right side surface and left side surface) of the holding member 12. Accordingly, air that has flowed in through the outer wall opening portions 36A can reliably flow into the cavities 19. Also, air that has flowed into the cavities 19 can reliably flow out to the exterior through the outer wall opening portions 36A.

In the inter-column partitioning wall 23, inter-column opening portions 43 through which the cavities 19 constituting the first cavity column 20 communicate with the cavities 19 constituting the second cavity column 21 are formed. Through the inter-column opening portions 43, air can flow out of or into the gap between the cavities 19 constituting the first cavity column 20 and the cavities 19 constituting the second cavity column 21. The inter-column partitioning wall 23 has two inter-column opening portions 43 that are aligned in the vertical direction. The inter-column opening portions 43 have shapes that are elongated in the left-right direction.

Effects of the Present Embodiment

Next, effects of the present embodiment will be described. The electricity storage module 11 according to the present embodiment includes: multiple electricity storage elements 10; and a holding member 12 formed by aligning a plurality of cavities 19 in which the multiple electricity storage elements 10 are stored, wherein an outer wall of the holding member 12 has outer wall opening portions 36 that communicate with the multiple cavities 19, and outer surfaces of the plurality of electricity storage elements 10 stored in the multiple cavities 19 are exposed to the exterior of the holding member 12 through the outer wall opening portions 36, and the holding member 12 has a first cavity column 20 in which cavities 19 among the multiple cavities 19 are aligned in two levels in an alignment direction, and a second cavity column 21 in which cavities 19 among the multiple cavities 19 are aligned in two levels in the alignment direction at positions shifted in a direction intersecting with the alignment direction.

External air flows into the interior of the holding member 12 through the outer wall opening portions 36 formed in the outer walls of the holding member 12. Since the outer surfaces of the electricity storage elements 10 are exposed at the outer wall opening portions 36, the outer surfaces of the electricity storage elements 10 are reliably cooled by air that has flowed in through the outer wall opening portions 36. This makes it possible to suppress a case in which the electricity storage elements 10 reach a high temperature. Thus, according to the present embodiment, it is possible to improve the heat dissipating property of the electricity storage module 11.

On the other hand, in the interior of the holding member 12, air that has been warmed by the heat generation of the electricity storage elements 10 can flow out to the exterior of the holding member 12 through the outer wall opening portions 36. This makes it possible to suppress a case in which the interior of the holding member 12 locally reaches a high temperature.

Also, the cavities 19 are aligned in two levels in the first cavity column 20 and the second cavity column 21. Accordingly, an arrangement is achieved in which two electricity storage elements 10 are aligned in the vertical direction. Also, since the outer surfaces of the electricity storage elements 10 face the exterior of the holding member 12 through the outer wall opening portions 36, there are no electricity storage elements 10 that are in an arrangement in which heat is trapped between multiple electricity storage elements 10. As a result, it is possible to suppress a case in which the electricity storage elements 10 reach a high temperature.

Also, the multiple electricity storage elements 10 are stored in the interiors of the cavities 19 in the first cavity column 20 and the cavities 19 in the second cavity column 21. Accordingly, four electricity storage elements 10 are stored in the holding member 12 with an improved heat dissipating property. As a result, if a relatively high voltage is required, the electricity storage elements 10 need only be connected in series, if a relatively longer lifespan is required, the electricity storage elements 10 need only be connected in parallel, and depending on the required conditions, it is possible to use a configuration in which the multiple electricity storage elements 10 are electrically connected using a combination of a series connection and a parallel connection.

Also, according to the present embodiment, the multiple electricity storage elements 10 each have an electrode surface 25 on which a pair of electrode terminals 24 are formed, and the multiple electricity storage elements 10 are arranged in the holding member 12 in a state in which the electrode surfaces 25 of the multiple electrode storage elements 10 stored in the first cavity column 20 and the electrode surfaces 25 of the multiple electrode storage elements 10 stored in the second cavity column 21 face mutually opposite directions.

Accordingly, the multiple electricity storage elements 10 can be compactly stored in the storage members 12. If the electricity storage elements 10 are stored compactly, heat tends to be trapped inside of the holding member 12, and therefore the present configuration is particularly effective in such a configuration.

According to the present embodiment, the holding member 12 includes an inter-column partitioning wall 23 that partitions the first cavity column 20 and the second cavity column 21, and the inter-column partitioning wall 23 includes inter-column opening portions 43 through which the first cavity column 20 communicates with the second cavity column 21.

Accordingly, since air can flow between the cavities 19 constituting the first cavity column 20 and the cavities 19 constituting the second cavity column 21, it is possible to further suppress a case in which the interior of the holding member 12 locally reaches a high temperature.

According to the present embodiment, the holding member 12 has an inter-layer partitioning wall 22 that partitions the multiple cavities 19 aligned in the alignment direction, and the inter-layer partitioning wall 22 has inter-layer opening portions 42 that penetrate through the inter-layer partitioning wall 22.

Accordingly, since air can flow between the multiple cavities 19 aligned in the alignment direction, it is possible to further suppress a case in which the interior of the holding member 12 locally reaches a high temperature.

According to the present embodiment, ribs 39 that protrude inward are respectively formed on inner walls of the plurality of cavities 19, and the multiple electricity storage elements 10 are stored inside of the multiple cavities 19 in a state in which gaps 41A are present between the multiple electricity storage elements 10 and the inner walls of the multiple cavities 19 due to the electricity storage elements 10 coming into contact with the ribs 39.

Accordingly, air can flow in the gaps 41A formed between the outer surfaces of the electricity storage elements 10 and the inner walls of the cavities 19. As a result, air that has flowed into the holding member 12 through the outer wall opening portions 36 can reliably cool the electricity storage elements 10 by coming into contact with a large portion of the outer surfaces of the electricity storage elements 10.

Embodiment 2

Figure 16:
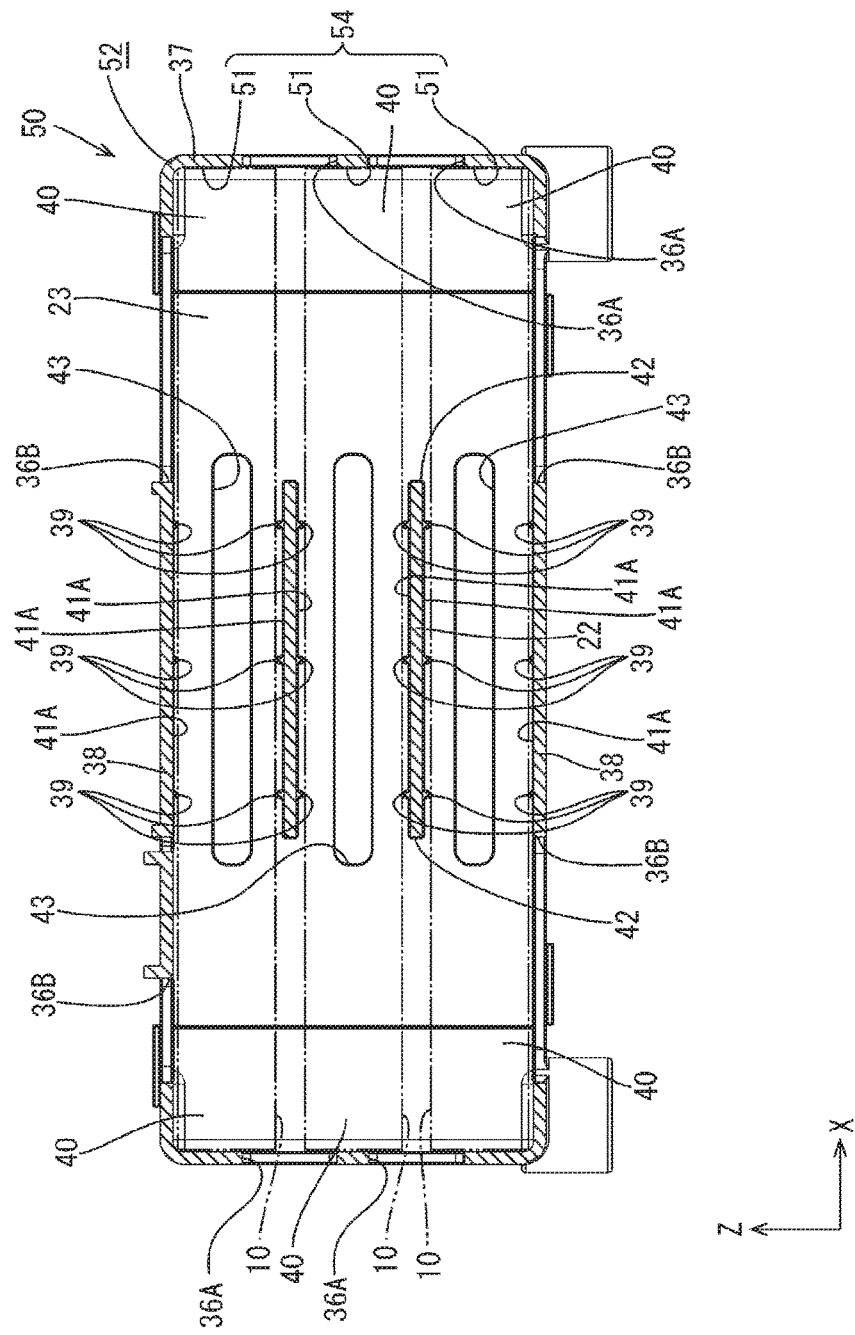
FIG. 16 is a cross-sectional view showing a holding member of an electricity storage module according to Embodiment 2.

Next, an electricity storage module 50 according to Embodiment 2 of the present invention will be described with reference to FIG. 16. In the present embodiment, multiple cavities 51 are formed in alignment in three levels in the vertical direction. Accordingly, an arrangement is achieved in which three electricity storage elements 10 are arranged in alignment in the vertical direction. Configurations other than that described above are approximately the same as those of Embodiment 1, and therefore identical members are denoted by identical reference numerals, and redundant description is not included.

The electricity storage module 50 according to the present embodiment includes: multiple electricity storage elements 10; and a holding member 52 formed by aligning multiple cavities 51 in which the multiple electricity storage elements 10 are stored, wherein an outer wall of the holding member 52 has outer wall opening portions 36A and 36B that communicate with the multiple cavities 51, and outer surfaces of the multiple electricity storage elements 10 stored in the multiple cavities 51 are exposed to the exterior of the holding member 52 through the outer wall opening portions 36A and 36B, and the holding member 52 has a cavity column 54 in which the multiple cavities 51 are aligned in three levels in the vertical direction (corresponds to an alignment direction).

According to the present embodiment, in one cavity column 54, three cavities 51 are aligned in the vertical direction. For this reason, compared to the electricity storage elements 10 arranged on the upper side and the lower side, the heat is more easily trapped in the electricity storage element 10 arranged in the center in the vertical direction.

In view of this, in the present embodiment, the outer surfaces of the electricity storage elements 10 are exposed through the outer wall opening portions 36A and 36B, and therefore the electricity storage elements 10 arranged on the upper side and the lower side are cooled by air that flows into the interior of the holding member 52 through the outer wall opening portions 36A and 36B. For this reason, the heat generated by the electricity storage element 10 arranged in the center in the vertical direction is dispersed to the exterior of the holding member 52 via the electricity storage element 10 arranged on the upper side and the electricity storage element 10 arranged on the lower side. As a result, it is possible to suppress a case in which the electricity storage element 10 arranged in the center in the vertical direction locally reaches a high temperature.

Other Embodiments

The present invention is not limited to the embodiment described with reference to the description above and the drawings, and for example, embodiments such as the following are encompassed within the technical scope of the present invention.

(1) In the present embodiment, the electrode surfaces 25 of the electricity storage elements 10 stored in the first cavity column 20 and the electrode surfaces 25 of the electricity storage elements 10 stored in the second cavity column 21 are in an orientation of facing mutually opposite directions. However, there is no limitation to this, and the electrode surfaces 25 of the electricity storage elements 10 stored in the first cavity column 20 and the electrode surfaces 25 of the electricity storage elements 10 stored in the second cavity column 21 can be in an orientation to facing any direction, according to need.

(2) In the present embodiment, a configuration is used in which the inter-column partitioning wall 23 has inter-column opening portions 43, but there is no limitation to this, and it is possible to use a configuration in which the inter-column partitioning wall 23 does not have inter-column opening portions 43.

(3) In the present embodiment, a configuration is used in which the inter-layer partitioning wall 22 has inter-layer opening portions 42, but there is no limitation to this, and it is possible to use a configuration in which the inter-layer partitioning wall 22 does not have inter-layer opening portions 42.

(4) In the present embodiment, a configuration is used in which ribs 39 are formed on the inner walls of the cavities 19, but the ribs 39 may be omitted.

(5) In each cavity column, the cavities may be aligned in three levels or more.

(6) It is possible to use a configuration in which the holding member 12 has three or more cavity columns.

(7) The multiple electricity storage elements 10 may be connected in series or in parallel, or a configuration may be used in which both a series connection and a parallel connection are present.

The invention claimed is:

1. An electricity storage module comprising:
a plurality of electricity storage elements; and
a holding member formed by aligning a plurality of cavities in which the plurality of electricity storage elements are stored,
wherein an outer wall of the holding member has outer wall opening portions through which the plurality of cavities communicate with the exterior, and outer surfaces of the plurality of electricity storage elements stored in the plurality of cavities are exposed from the outer wall through the outer wall opening portions, and
the holding member has a first cavity column in which cavities among the plurality of cavities are aligned in two levels in an alignment direction, and a second cavity column in which cavities among the plurality of cavities are aligned in two levels in the alignment direction at positions shifted in a direction intersecting with the alignment direction, and the holding member further includes: an inter-column partitioning wall that partitions the first cavity column and the second cavity column; and an inter-layer partitioning wall that partitions the plurality of cavities aligned in the alignment direction,
the plurality of electricity storage elements each have an electrode surface on which a pair of electrode terminals are formed,
the plurality of electricity storage elements are arranged in the holding member in a state in which the electrode surfaces of the plurality of electrode storage elements stored in the first cavity column and the electrode surfaces of the plurality of electrode storage elements stored in the second cavity column face mutually opposite directions,
electrode terminals of the electricity storage elements arranged in the first cavity column and electrode terminals of the electricity storage elements arranged in the second cavity column are electrically connected by a bus bar,
the inter-layer partitioning wall has an inter-layer opening portion that penetrates through the inter-layer partitioning wall,
the inter-column partitioning wall has a portion that penetrates through the inter-layer opening portion, the portion of the inter-column partitioning wall that penetrates through the inter-layer opening portion has a recessed portion at which a gap is formed between the inter-column partitioning wall and the electricity storage elements, and the recessed portion is exposed to the exterior of the holding member through the outer wall opening portion.

2. The electricity storage module according to claim 1, wherein the inter-column partitioning wall includes an inter-column opening portion through which the first cavity column communicates with the second cavity column.

3. The electricity storage module according to claim 1, wherein
ribs that protrude inward are formed on inner walls of the plurality of cavities, and
the plurality of electricity storage elements are stored in the interiors of the plurality of cavities in a state in which gaps are present between the plurality of electricity storage elements and the inner walls of the plurality of cavities due to the electricity storage elements coming into contact with the ribs.

4. The electricity storage module according to claim 2, wherein ribs that protrude inward are formed on inner walls of the plurality of cavities, and the plurality of electricity storage elements are stored in the interiors of the plurality of cavities in a state in which gaps are present between the plurality of electricity storage elements and the inner walls of the plurality of cavities due to the electricity storage elements coming into contact with the ribs.

* * * * *